United States Patent
Saha et al.

(10) Patent No.: US 7,991,744 B2
(45) Date of Patent: Aug. 2, 2011

(54) METHOD AND SYSTEM FOR DYNAMICALLY COLLECTING DATA FOR CHECKPOINT TUNING AND REDUCE RECOVERY TIME

(75) Inventors: Abhijit Saha, West Bengal (IN); Sudip Bhowmik, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 12/171,110

(22) Filed: Jul. 10, 2008

(65) Prior Publication Data

US 2010/0011026 A1    Jan. 14, 2010

(51) Int. Cl.
*G06F 7/00* (2006.01)
*G06F 17/00* (2006.01)
(52) U.S. Cl. .................. 707/648; 707/649; 707/688
(58) Field of Classification Search .................. None
See application file for complete search history.

(56) References Cited

U.S. PATENT DOCUMENTS
2008/0306982 A1* 12/2008 Moudy ........................ 707/102
2009/0248621 A1* 10/2009 Dageville et al. ................ 707/2

OTHER PUBLICATIONS

"Comparative Analysis of Periodic State Saving Techniques in Time Warp Simulators", by Fleischmann et al., IEEE, 1995.*

* cited by examiner

*Primary Examiner* — Jay A Morrison
(74) *Attorney, Agent, or Firm* — Cahn & Samuels, LLP

(57) ABSTRACT

A system and method for checkpoint tuning in a computer environment comprising a processor coupled to a statistical database and at least one database or table manager and data log files. The data log files store data relating to the operations of the database or table manager. The processor executes a module that captures data comprising the number of operations, the time taken by the checkpoint process, folded journal entries, long running transactions, and the ratio of WRITE: READ operations. The processor then stores the captured data and processes the collected data, generating statistics therefrom. The statistical data is stored in the statistical database. The system selects checkpoint intervals based on the data statistics; and implements the checkpoint intervals.

14 Claims, 4 Drawing Sheets

METHOD AND SYSTEM FOR DYNAMICALLY COLLECTING DATA FOR CHECKPOINT TUNING AND REDUCE RECOVERY TIME

I. FIELD OF THE INVENTION

This invention relates in general to the field of computer systems and to dynamically collecting data for checkpoint tuning and reduction of recovery time.

II. DESCRIPTION OF THE PRIOR ART

The challenge to system administration lies in providing maximum throughput and minimum downtime. Complications arise when the operations are complex and voluminous. Though today's hardware and software guarantees enormous stability and reliability and at the same time the business requirement has become more competitive and demanding. Effective system administration needs more precise information about system behavior operation information, coupled with precise planning and effective implementation.

U.S. Patent Publication US20060075002A1 discloses a method of journaling changes to system objects. A dummy function is substituted for a system function. The system function is executed under operation of the dummy function. Copies of system objects changed by execution of the system function are generated for journaling. Execution of the dummy function is then completed. Preferably the system objects are OS/400 system objects. The system objects may be program objects, configuration objects, queues and space/memory mapped objects. The copies of the system objects may be journaled for replication on another system. A system and software for journaling changes to system objects are also disclosed.

U.S. Pat. No. 6,332,200 discloses a complete and consistent set of checkpoint files captured and identified for use in restarting a parallel program. When each process of a parallel program takes a checkpoint, it creates a checkpoint file. The checkpoint file is named, and a part of that name includes a version number for the checkpoint file. When a parallel program is to be restarted, each process of the parallel program identifies its most current valid checkpoint file. It provides the version number of this file to a coordinating process. The coordinating process then decides which version of the checkpoint files is valid and complete for all of the processes of the parallel program participating in restart. Once this version number is determined, it is forwarded to the processes and the processes restore themselves using its corresponding checkpoint file having that particular version number.

U.S. Pat. No. 7,058,849 discloses a mechanism and method for maintaining a consistent state in a non-volatile random access memory system without constraining normal computer operation is provided, thereby enabling a computer system to recover from faults, power loss, or other computer system failure without a loss of data or processing continuity. In a typical computer system, checkpointing data is either very slow, very inefficient or would not survive a power failure. In embodiments of the '849 disclosure, a non-volatile random access memory system is used to capture checkpointed data, and can later be used to rollback the computer system to a previous checkpoint. This structure and protocol can efficiently and quickly enable a computer system to recover from faults, power loss, or other computer system failure.

U.S. Pat. No. 6,988,165 discloses a system and method for improving the efficiency of write operations by intelligently managing disk pages that are written during checkpoint operations so that write operations can occur with reduced numbers of writes. As write data is received and cached, for example, by a database application, disk pages are allocated to the write data. When a checkpoint operation is taken to write the data cache to disk as modifications or additions to the database file, an intelligent write management module re-assesses the disk page allocation and re-maps disk writes to improve the efficiency of disk input/output (I/O) operations. As such, significant improvements in the speed and efficiency of database operations during checkpoint events are achieved.

U.S. Pat. No. 6,895,416 is directed to a checkpointing file system of a distributed-memory parallel supercomputer comprising a node that accesses user data on the file system, the file system comprising an interface that is associated with a disk for storing the user data. The checkpointing file system provides for taking and checkpoint of the file system and rolling back to a previously taken checkpoint, as well as for writing user data to and deleting user data from the checkpointing file system. The checkpointing file system provides a recently written file allocation table (WFAT) for maintaining information regarding the user data written since a previously taken checkpoint and a recently deleted file allocation table (DFAT) for maintaining information regarding user data deleted from since the previously taken checkpoint, both of which are utilized by the checkpointing file system to take a checkpoint of the file system and rollback the file system to a previously taken checkpoint, as well as to write and delete user data from the checkpointing file system.

U.S. Pat. No. 6,708,288 is directed to compiler-based checkpointing for error recovery. In various embodiments, a compiler is adapted to identify checkpoints in program code. Sets of data objects are associated with the checkpoints, and checkpoint code is generated by the compiler for execution at the checkpoints. The checkpoint code stores state information of the associated data objects for recovery if execution of the program is interrupted.

U.S. Pat. No. 6,351,754 discloses a method and system for reducing overhead associated with recovering after a failure. According to this method, a checkpoint value is maintained that indicates which records of a plurality of records have to be processed after the failure. The plurality of records contain change information that corresponds to a plurality of data blocks. A target checkpoint value is determined based on a desired number of data block reads that will be required during a redo phase of recovery. Changes contained in volatile memory are then written to nonvolatile memory to advance the checkpoint value to at least the target checkpoint value. According to another aspect of the '754 disclosure, the target checkpoint value is determined using a circular queue of offset buckets. The offset buckets are used to store index values that are associated with buffers in the ordered list. The target checkpoint value is periodically set equal to an index value that is contained in an offset bucket. According to another aspect of the '754 disclosure, the target checkpoint value is determined by calculating a maximum number of records that should be processed after the failure. The maximum number of records is based on the desired number of data block reads that will be required during the redo phase of the recovery. The target checkpoint value is updated based on the maximum number of records.

U.S. Pat. No. 6,253,212 discloses a method and system for maintaining a checkpoint value that indicates which records of a plurality of records associated with updates made before a failure have to be processed after the failure. According to one aspect of the '212 disclosure, an ordered list of buffers is maintained in volatile memory. The ordered list of buffers has a head and a tail. The ordered list of buffers is maintained by writing a record that indicates the update to nonvolatile memory and adding the buffer to the tail of the ordered list whenever an update is made to a data item within a buffer in volatile memory. When a data item contained in a buffer within the ordered list is stored in nonvolatile memory, the buffer can be removed from the ordered list. A checkpoint value that identifies a record associated with a buffer located at the head of the ordered list is written to nonvolatile memory. According to another aspect, after a failure, the record associated with the checkpoint value is identified. If a particular record was stored to nonvolatile memory before the record associated with the checkpoint value, the particular record is not processed. If the particular record was not stored to nonvolatile memory before the record associated with the checkpoint value, the particular record is processed.

U.S. Pat. No. 5,452,430 discloses a data processing system for the storage of persistent and non-persistent data in a queue, and a method for the storage of data which is required to survive a system failure (persistent data) and data which is not required to survive a system failure (non-persistent data) on a single queue. The method involves receiving persistent and non-persistent data to be stored in a queue, then marking the data in time sequence order, before storing the persistent data in a first set of data pages and the non-persistent data in a second set of data pages. Upon receiving a request for removal of data from the queue, both the first and second sets of pages are checked and the data is removed in time sequence order. A log file is preferably created to enable recovery in the event of failure and restart of the queue. When receiving and removing persistent data to be stored in and to be removed from the queue, log entries are made of changes to the persistent data only. Before the receiving of the data, a table in space map pages is created indicating which pages available in storage are free, which are allocated for persistent data, and which are allocated for non-persistent data. After receiving data and removing data, the table is updated. In the event of a failure and restart of the queue, space map page table is scanned and updated to indicate that all pages containing non-persistent data are free.

III. SUMMARY OF THE INVENTION

Current solutions require a system administrator to simply make an educated guess at the various parameters that are germane to determining efficient checkpoints and then employ trial and error to tune the system's performance. This process ultimately leaves substantial room for improvement regarding the efficiency of system function and the time required for system recovery in the event of a restart.

If a system were able to accumulate comprehensive data and employ that comprehensive data to tune the parameters of system administration, a user or system administrator could perform checkpoint tuning in a more efficient well informed way, improve the tuning mechanism and reduce the recovery time in the event of an unforeseen failure or restart.

Disclosed is a system for checkpoint tuning in a computer environment comprising a processor coupled to a statistical database and at least one journal receiver (logger, logging the transactions). The journal receiver stores data relating to the operations of the queue manager (file/database/table etc.). The processor executes a module, or program, that captures data comprising the number of operations, the time taken by the checkpoint process, folded journal entries, unresolved long running transactions, and the ratio of WRITE:READ operations. The processor stores the collected data and processes the collected data generating statistics therefrom. The processed data is stored in the statistical database. The system selects checkpoint intervals based on the data statistics; and implements the checkpoint intervals.

Also disclosed is a method for checkpoint tuning in a computer environment comprising executing a process concurrently with a database or table manager, wherein the process monitors the database manager and dynamically captures data from the database manager. The process dynamically captures data comprising the number of operations, the number of operations between at least two checkpoints, and the time taken by the checkpoint process. The thread also captures data regarding folded journal entries, long running transactions and the ratio of WRITE:READ operations. The method includes storing the collected data, processing the collected data and generating statistics therefrom. The method also includes selecting checkpoint intervals based on the data statistics generated and implementing the checkpoint intervals.

Also disclosed is a method for checkpoint tuning in a computer environment comprising executing a batch program to collect data from data logs associated with a database manager. The collected data comprises the number of operations, the number of operations between at least two checkpoints and the time taken by the checkpoint process. The collected data also includes folded journal entries, long running transactions, and the ratio of WRITE:READ operations. The method includes storing the collected data, processing the collected data and generating statistics therefrom. The method also includes selecting checkpoint intervals based on the data statistics and setting the checkpoint intervals.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

Various embodiments are discussed in detail below. While specific implementations of the disclosed technology are discussed, it should be understood that this is done for illustration purposes only. A person skilled in the relevant art will recognize that other components and configurations may be used without departing from the spirit and scope of the invention.

The disclosure relates to a system, method and computer program product for efficiently distributing task assignments to a plurality of client computers coupled to at least one server forming a client grid. The system employs a monitoring agent that resides on each client computer coupled to the grid to monitor that particular client computer's resource availability and transmit relevant data to the grid server. The server uses this data to optimize the tasking to that particular client computer. This technology may be employed on any system that uses checkpoint like databases and other middleware or software solutions.

A checkpoint is a sequence of instructions in a computer program for recording the status of execution for restarting. A point at which information about the status of a job and the system can be recorded so that the job step can be later restart.

Figure 1:
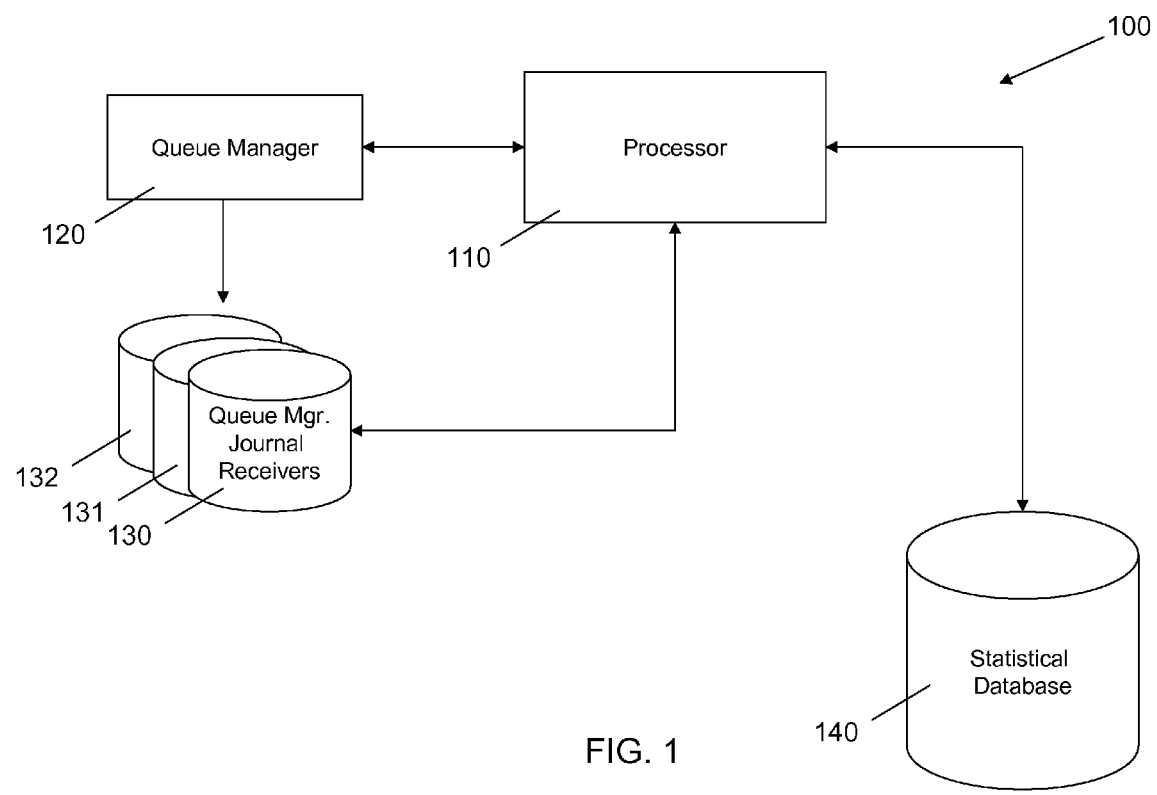
FIG. 1 illustrates a block diagram of an exemplary system on which the method for dynamically collecting data for checkpoint tuning and reducing recovery time may be employed.

Referring now to the figures, wherein like reference numbers denote like components, elements, or features, FIG. 1 illustrates a block diagram of an exemplary system 100 on which the method for dynamically collecting data for checkpoint tuning and reducing recovery time may be employed. While this exemplary system employs a MQ type configuration this invention is not limited to MQ type systems as the system and methods disclosed herein may be employed on other checkpointing type firmware.

The system 100 features at least one processor 110, that is coupled to at least one queue manager 120 and is able to employ a process or thread that is able to monitor the operations of the queue manager 120. The system 100 also features at least one journal receiver 130 coupled to a queue manager 120. The journal receiver is able to store historic data relating to the operation of the queue manager 120.

The system writes entries to at least one journal receiver relating to the status of or details associated with a particular object. In the event of a failure, the journal receiver 130 contains historical data useful in restarting the object from the point of the last journal entry. The journal receiver 130 is also coupled to the processor 110 and the processor employs a module to scan the journal receiver 130 and capture data stored in the journal receiver. Processor 110 is also coupled to a database 140. The database 140 is configured to receive processed data from the processor 110 and store the processed data for later use.

Figure 2:
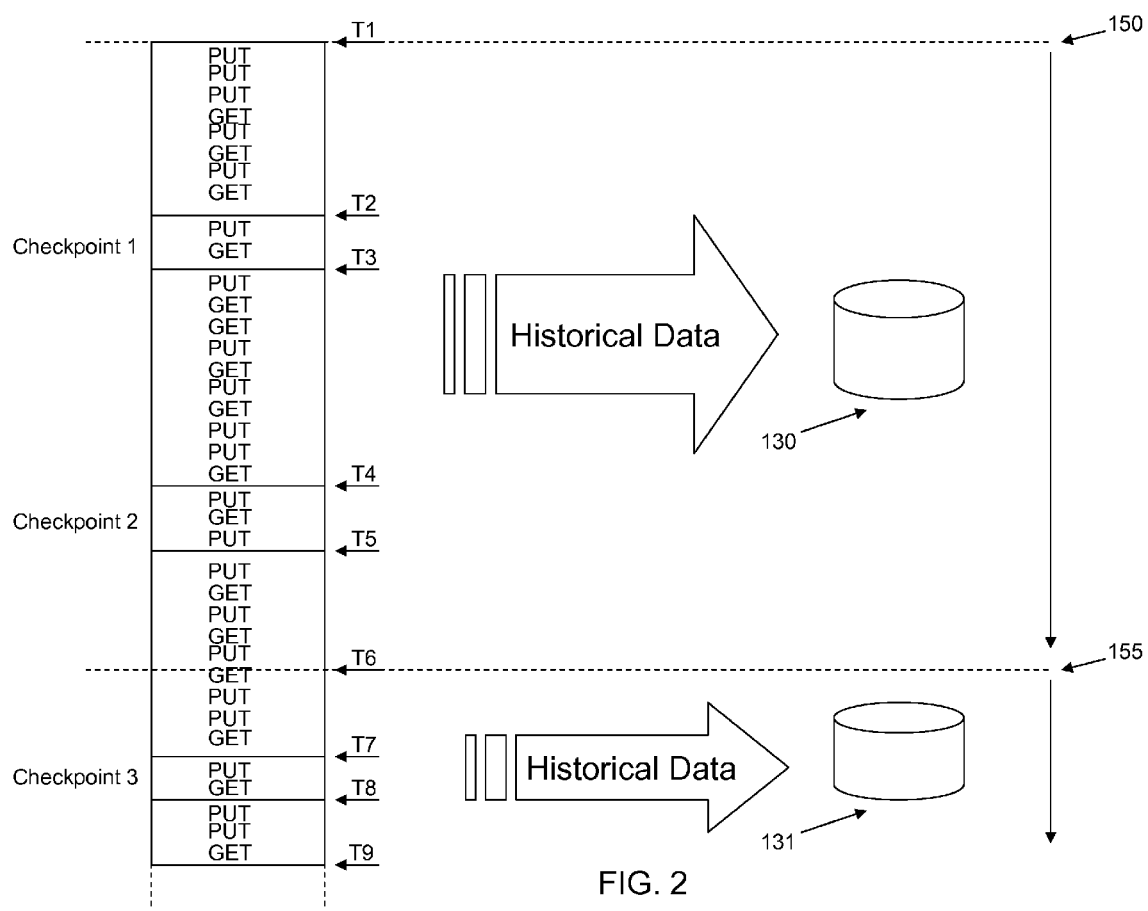
FIG. 2 illustrates a graphical representation of the operations of a queue manager over time including the checkpointing operations and two queue manager journal receivers for storing checkpoint and operations data.

FIG. 2 illustrates an exemplary representation of the operations of a queue manager over time including the checkpointing operations and two queue manager journal receivers for storing checkpoint and operations data. Queue manager journal receivers 130, 131 store historical checkpoint and operations data for future recall, for example in the event of a system failure. In this example historical data for a first period 150 includes T1 thru T6 and is stored in journal receiver 130. Historical data for a second period 155 includes T6 thru T9 is stored in a second journal receiver 131.

With continued reference to FIG. 1 and FIG. 2 in operation processor 110 executes a module or thread or program that captures data comprising the number of queue operations, the time taken by the checkpoint process, folded journal entries, long running transactions, and the ratio of PUT:GET operations. The processor 110 stores the collected raw data, and processes the collected raw data generating statistical data therefrom. The statistical data is stored in the statistical database 140. The system selects new checkpoint intervals based on the data statistics; and implements the selected checkpoint intervals.

The data can be collected by either dynamically, directly from monitoring agent running concurrently with the queue manager 120, or from historical data stored in one or more journal/receivers 130, 131, 132. The data is stored in a database 140 for administrators to query and extract the relevant/required information to facilitate tuning decisions.

Figure 3:
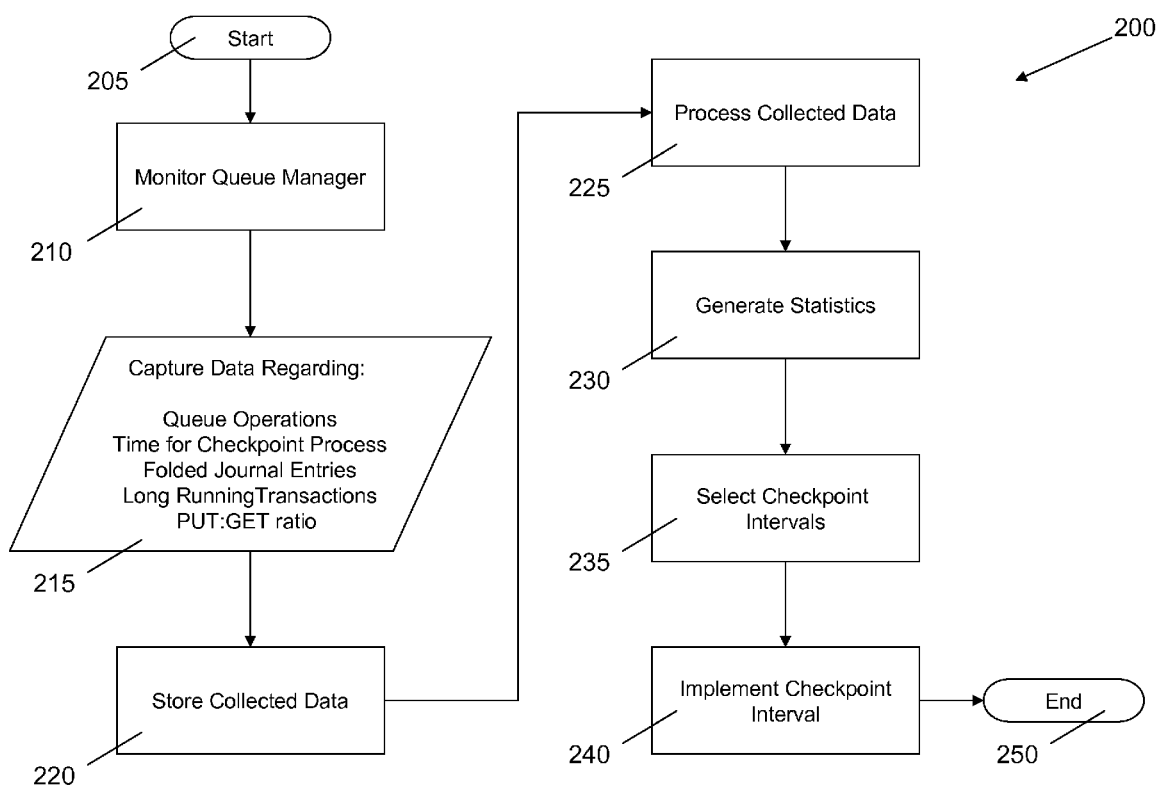
FIG. 3 illustrates a flowchart of a method for dynamically collecting data directly from the queue manager for checkpoint tuning and reducing recovery time.

In yet another embodiment the invention resides in a method for dynamically collecting data for checkpoint tuning and employing this data to strategically select checkpoints and reduce recovery time in the event of a failure or restart. Referring now to FIG. 3, with continued reference to FIG. 1, FIG. 3 illustrates a flowchart 200 of an exemplarily embodiment of a method for dynamically collecting data directly from the queue manager for checkpoint tuning and reducing recovery time. A users executes a monitoring command, in response to the monitoring command the system starts the process 205. Once the process is initiated, processor 110 executes a process concurrently with an active queue manager, wherein the process monitors the queue manager 210 and dynamically captures data from the queue manager 215. The process dynamically captures data 215 comprising the number of queue operations, the number of queue operations between at least two checkpoints, and the time taken by the checkpoint process. The thread may also capture data regarding folded journal entries, long running transactions and the ratio of PUT:GET operations. The method includes storing the collected data 220 and processing the collected data 225. The method includes generating statistics from the collected data 230 and storing this statistical data. The checkpoint intervals are selected and fine tuned based on the data statistics generated from the collected data 235. The Checkpoint intervals selected base on the data statistics are then implemented 240.

The collection of data can be implemented by one or more commands which spawn individual threads that are configured to collect specific data from the active queue. In this example embodiment, a single command may be configured to capture the number of queue entries, the number of queue operations between two checkpoints, the time taken by the checkpoint process, folded journal entries and information about long running transactions. This information may be collected for a particular period of time, say 30 minutes interval, or for a period of hours or days, from date-time to date-time.

In yet another exemplarily embodiment one thread may collect the total operation data for a given period of time. A second thread may be employed to collect Checkpoint related information, for example the time that operations are suspended because of the setting of checkpoints. A third thread may collect folded journal entries if the size of the data entries require multiple journal entries. A fourth thread may collect information about long running transactions.

A second command may monitor other process parameters such as the ratio of PUT/GET operations per queue/per minute or the ratio of PUT/GET operations over a period of time. This command is useful in fine tuning the selection of checkpoints. The number and distribution of commands regarding the capture of data is not a limitation of this technology.

Referring again to FIG. 1 and FIG. 2 the data may be captured directly from the queue manager 120 or from historical data recording the queue managers operation stored in one or more queue manager journal receivers 130, 131, 132.

The total number of PUT and GET operations for the persistence messages is captured for a desired time frame. For example from T1-T4 or from T1-T8. Preferably, the data is collected over a period of a few days during peak operational hours to provide an accurate projection of the operational load. An average of these operations against time indicates the frequency of operations and assists an administrator in the selection of checkpoint intervals. The total of PUT and GET operations for each time interval allows an administrator to project the total operations, and when averaged over a number of days against the time period for which this data is collected provides very comprehensive data statistics on the workload to assist the administrator in calculating accurate checkpoint intervals.

Data regarding the number of queue operations between two checkpoints specifies the number of persistent operations that occur between two checkpoints starts (and also whether the number of operations, or the wait time) forced the checkpoint. An example of this data would be the number of operations from T2-T4 which is the time frame preceding checkpoint 2. This statistic gives a clear indication on the total number of operation happening at the current checkpoint setting. The checkpoint process typically gets executed after a specified number of operations happening at the current checkpoint setting. The actual number of operations that occur between two checkpoint processes may vary if the time interval gets exhausted before the maximum number of operations threshold is reached and a checkpoint is taken. Thus, the number of queue operations between two checkpoints may be used in two ways. First it may be employed to determine the actual number of operations before setting the tuning parameters of the checkpoint operations and second, it allows an administrator to gauge the effect of a change to the checkpoint settings.

Data regarding time taken by the checkpoint process is useful as it allows an administrator to optimize the time designated therefore. An example of this type of data is the time from T2-T3 or from T4-T5. When a checkpoint job is running, other jobs are locked out from writing to the journal through the global mutex and any PUTs or GETs needing to write to the journal are blocked until the checkpoint job is complete. If the time taken between the start and end of the checkpoint process is too long then it indicates the amount of data is substantial. In such cases it is preferable to reduce the amount of time between checkpoints. When the checkpoint process duration is small, implicating very little data written to the register, the time between checkpoints may be increased.

Data regarding folded journal entries are the log records of the persistent data occupying multiple physical journal records in the journal due to the record's large size. Typically, maximum journal data that can be sent through one journal write operation is around 32 KB; this can differ in other implementations. Entries larger than 32 KB are split into multiple journal records. The data example of this type of data is shown from time T1-T8 which bridges multiple journal receivers. This data is useful in that it assists the administrator in estimating the time to be taken by queue manager restart. If too many folded entries are present MQ has to read multiple records delaying restart.

Data regarding unresolved long running transactions, transactions that span across multiple receivers, is also captured. This data assist the administrator in detecting long running transactions so that he make take appropriate action, like commit or rollback. This type of data would be collected at T6. The data is processed by using the transaction id which the MQ keeps and maintains. At the time of the receiver change the id of active transactions is captured and a backward scan is initiated. The scan searches backwards through the receiver chain to find out the point where each transaction has been originated. If any transaction spans over multiple receivers the inference is a long running transaction.

The statistics of the ratio of PUT/GET operations per queue per minute gives an indication of the nature of the activity happening in the checkpoint operations. This information, for example collected from T1-T8, is used for application tuning purposes. If an application is effectively designs the frequency of PUT equals the GET volume and the data that must be committed to the queue file is minimal, thus the checkpoint process gets quicker.

Figure 4:
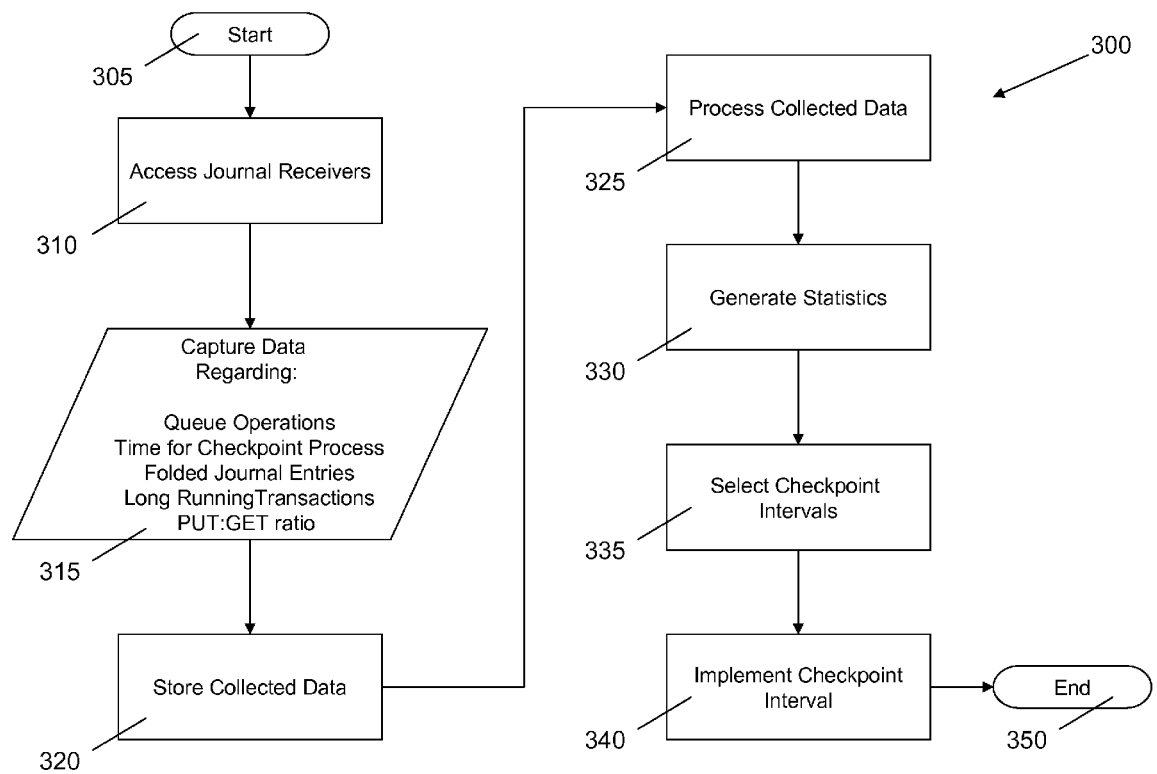
FIG. 4 illustrates a flowchart of a method for collecting data from at least one queue manager journal receivers for checkpoint tuning and reducing recovery time.

In yet another embodiment the invention resides in a method for checkpoint tuning wherein a batch program is executed collecting data from journal receivers associated with a queue manager. In this embodiment the activity of a queue manager is not necessary. The queue managers may be inactive as the data is collected from the journal receivers. Referring now to FIG. 4, with continued reference to FIGS. 1 and 2, FIG. 4 illustrates a flowchart for the method that collects data from the journal receivers. The process is initiated when a user executes a monitoring command. In response to the monitoring command the system starts the process 205. Once the process is initiated, processor 110 executes a process independent of the status of the queue manager. In this embodiment the processor executes a batch program and accesses the journal receivers 310 and captures data from at least one journal receiver 130 associated with at least one queue manager 120.

The process retrieves data 315 comprising the number of queue operations, the number of queue operations between at least two checkpoints, and the time taken by the checkpoint process. The process also retrieves data regarding folded journal entries, unresolved long running transactions and the ratio of PUT:GET operations. The method includes storing the collected data 320 and processing the collected data 325. The method includes generating statistics from the collected data 330 and storing this statistical data. The checkpoint intervals are selected and fine tuned based on the data statistics generated from the collected data 335. The Checkpoint intervals selected base on the data statistics are then implemented 340.

In yet another embodiment the invention resides in a method for checkpoint tuning in a computer environment comprising executing a process concurrently with a database or table manager, wherein the process monitors the database manager and dynamically captures data from the database manager. The process dynamically captures data comprising the number of operations, the number of operations between at least two checkpoints, and the time taken by the checkpoint process. The thread also captures data regarding folded LOG file entries, long running transactions and the ratio of WRITE: READ operations. The method includes storing the collected data, processing the collected data and generating statistics therefrom. The method also includes selecting checkpoint intervals based on the data statistics generated and implementing the checkpoint intervals.

In yet another embodiment the invention resides in a computer program product comprising computer-usable medium having a computer-usable program code for checkpoint tuning in a computer environment. The computer program product features computer-usable program code for storing data relating to the operations of a queue manager and computer-usable program code for capturing data comprising the number of queue operations, the time taken by the checkpoint process, folded journal entries, long running transactions, and the ratio of PUT:GET operations. The computer program product also features computer-usable program code for storing the collected data and computer-usable program code for processing the collected data and computer-usable program code for generating statistics from said capture data. The computer program also features computer-usable program code for storing the processed statistical data in a database. The computer program product also has computer-usable program code for selecting checkpoint intervals based on the data statistics; and computer-usable program code for implementing the checkpoint intervals.

The disclosed invention can take the form of an entirely hardware embodiment, an entirely software embodiment or an embodiment containing both hardware and software elements. In at least one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory, (CD-ROM), compact disk-read/write (CD-R/W) and DVD.

A data processing system suitable for storing and/or executing program code will include at least one processor coupled directly or indirectly to memory elements through a system bus. The memory elements can include a local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be understood that each block of the flowchart illustrations and block diagrams and combinations of those blocks can be implemented by computer program instructions and/or means.

Although specific example embodiments have been illustrated and described herein, those of ordinary skill in the art appreciate that other variations, aspects, or embodiments may be contemplated, and/or practiced without departing from the scope or the spirit of the appended claims.

For example though the various exemplarily embodiments show a MQ queue type configuration, a queue is equivalent to a TABLE/DATABASE/FILE and a queue manager may be any type of table or database or file manager. The PUT and GET operations are simply WRITE and READ operations and the queue journals discussed though this text are equivalent to LOG files.

The invention claimed is:

1. A method for checkpoint tuning in a computer environment comprising:
    executing a process concurrently with a database manager, wherein said process;
    monitors said database manager;
    dynamically captures data comprising:
        the number of operations,
        the number of operations between at least two checkpoints,
        the time taken by the checkpoint process,
        folded journal entries,
        unresolved long running transactions, the unresolved long running transactions are operations which span across multiple loggers and fail to terminate upon a logger change, and
        the ratio of WRITE:READ operations; and
    stores said collected data;
    processing said collected data and generating statistics therefrom;
    selecting checkpoint intervals based on said data statistics; and
    implementing said checkpoint intervals.

2. The method of claim 1 wherein said number of operations is the total of all WRITE and READ operations for the persistence data.

3. The method of claim 1 wherein said time taken by the checkpoint process is the time that other jobs are locked out from writing to the LOG files and WRITE and READ operations are blocked.

4. The method of claim 1 wherein said folded journal entries are log records of persistent data occupying multiple physical records in a log file.

5. The method of claim 1 wherein said long running transactions are determined by capturing, at the time of said logger change, the transaction ID maintained by the underlying software;
    scanning backwards through the logger chain; and
    determining the point where each transaction originated.

6. A method for checkpoint tuning in a computer environment comprising:
    executing a batch program to collect data from data LOG files associated with a database manager, said collected data comprising:
        the total number of operations,
        the number of operations between at least two checkpoints,
        the time taken by the checkpoint process,
        folded journal entries, the folded journal entries are a log record of persistent data occupying multiple physical records in the data LOG files,
        long running transactions, the long running transactions are operations which span across multiple data LOG files and fails to end upon a LOG file change, and
        the ratio of WRITE:READ operations;
    storing said collected data;
    processing said data and generating statistics therefrom;
    selecting checkpoint intervals based on said data statistics; and
    setting said checkpoint intervals.

7. The method of claim 6 wherein said number of data operations is the total of all WRITE and READ operations for the persistence data.

8. The method of claim 6 wherein said time taken by the checkpoint process is the time that other jobs are locked out from writing to the data LOG files and WRITE and READ operations are blocked.

9. The method of claim 6 wherein said long running transactions are determined by capturing, at the time of said LOG file change, the transaction ID maintained by the underlying software;
  scanning backwards through the LOG file chain; and
  determining the point where each transaction originated.

10. A system for checkpoint tuning in a computer environment comprising:
  a statistical database;
  at least one queue manager journal receiver, said queue manager journal receiver storing data regarding the activities of said queue manager; and
  a processor coupled to said statistical database, said processor executes a module that captures data comprising:
    the number of queue operations,
    the time taken by the checkpoint process,
    folded journal entries, the folded journal entries are a log record of persistent data occupying multiple physical records in data LOG files,
    long running transactions, the long running transactions are operations which span across multiple data LOG files and fails to end upon a LOG file change, and
    the ratio of PUT:GET operations;
  processes said collected data and generating statistics therefrom;
  stores said statistical data in said statistical database;
  selects checkpoint intervals based on said data statistics; and
  implements said checkpoint intervals.

11. The system of claim 10 wherein said module is executed concurrently with a queue manager;
  monitors said queue manager; and
  dynamically captures data directly from said queue manager.

12. The system of claim 10 wherein said module executes a batch program to collect data from said at least one journal receiver associated with a queue manager.

13. The system of claim 11 wherein said number of queue operations comprise the number of queue operations between at least two checkpoints.

14. The system of claims 12 wherein said number of queue operations comprise the number of queue operations between at least two checkpoints.

* * * * *